US005771439A

United States Patent [19]
Kennedy, Jr. et al.

[11] Patent Number: 5,771,439
[45] Date of Patent: Jun. 23, 1998

[54] ADAPTIVE ANTENNA SYSTEM AND METHOD FOR CELLULAR AND PERSONAL COMMUNICATION SYSTEMS

[75] Inventors: Joseph Patrick Kennedy, Jr., Great Falls; Phillip Donald Harvey, Herndon; Mark Cameron Sullivan, Annandale, all of Va.

[73] Assignee: Raytheon E-Systems, Inc., Dallas, Tex.

[21] Appl. No.: 650,354

[22] Filed: May 20, 1996

[51] Int. Cl.[6] .............................. H04B 1/10; H04B 15/00

[52] U.S. Cl. .............................. 455/63; 455/65; 455/67.3; 455/278.1; 455/424; 455/506; 455/562

[58] Field of Search .............................. 455/62, 63, 67.1, 455/67.3, 422, 424, 507, 517, 561, 562, 65, 273, 275, 278.1, 504, 506; 342/162, 367, 368, 379, 380, 382

[56] References Cited

U.S. PATENT DOCUMENTS

| | | | |
|---|---|---|---|
| 4,544,927 | 10/1985 | Kurth et al. | 343/373 |
| 4,931,977 | 6/1990 | Klemes | 364/581 |
| 4,980,691 | 12/1990 | Rigg et al. | 342/372 |
| 5,081,464 | 1/1992 | Renshaw | 342/375 |
| 5,274,386 | 12/1993 | Pellon | 342/380 |
| 5,274,844 | 12/1993 | Harrison et al. | 455/25 |
| 5,434,578 | 7/1995 | Stehlik | 342/383 |
| 5,510,796 | 4/1996 | Applebaum | 342/162 |
| 5,532,700 | 7/1996 | Lockwood | 342/378 |
| 5,634,199 | 5/1997 | Gerlach et al. | 455/63 |
| 5,671,168 | 9/1997 | Liu et al. | 364/724.18 |
| 5,685,308 | 11/1997 | Wright et al. | 128/660.07 |

*Primary Examiner*—Andrew I. Faile
*Assistant Examiner*—Vincent Boccio
*Attorney, Agent, or Firm*—Rogers & Killeen

[57] ABSTRACT

A signal processing system and method for improving reception of plural signals received at an antenna array in a wireless communication system by increasing the carrier-to-interference plus noise ratio and by decreasing signal envelope variance of each of the plural signals using single or multiple stage subspace projection and a constant modulus beamformer. Each of the stages separate and optimize one of the signals and projects the remaining signals (if present) to the subspace of the next stage. In the method and system the plural signals received at each antenna are converted to baseband in a wideband RF downconverter. Received signals are thereafter provided in digital form to the constant modulus beamformer where each stage of the beamformer separates one of the plural signals from a stage input so that a stage output has the remaining ones of the plural signals, and projects the stage output onto a subspace of the remaining signals in the next stage. The subspace basis is given by the set of eigenvectors associated with the N largest eigenvalues of the spatial covariance matrix R. This basis is preferably found iteratively using a linearized stochastic gradient ascent (SGA) algorithm.

24 Claims, 4 Drawing Sheets

ADAPTIVE ANTENNA SYSTEM AND METHOD FOR CELLULAR AND PERSONAL COMMUNICATION SYSTEMS

BACKGROUND OF THE INVENTION

The present invention relates to wireless communication receivers, and more particularly to an adaptive antenna array receiver system for cellular and personal communication systems.

Wireless communication systems, such as mobile cellular communications and personal communications systems (PCS), are allocated certain spectrums of frequencies with a limited number of channels. Increasing utilization of these limited frequency spectrums provides system operators with an incentive to develop a communication system which increases the maximum number of users in the system.

The basic concept behind a cellular/PCS system is the re-use of frequencies which allows a large number of simultaneous users on the system, preferably a number substantially larger than the finite number of channels in a particular band. To this end, a geographic region may be divided into smaller areas known as cells. Each cell contains its own low-power transmitter and receiver. Two different users within the larger geographic region may simultaneously use the same frequency channel, as long as the users are in different cells. Both the division of the geographic region into cells and the division of the allocated frequency spectrum into frequency subsets for each cell depends on the system's desired performance characteristics. Generally, the cell scheme takes into account the characteristics of the geographic area to provide an efficient system capable of handling a large number of users. Further, one or more cells may each be dynamically split to provide increased efficiently during time periods of heavy use. Currently, in many geographic areas, the system operators have employed most known frequency reuse and cell splitting techniques yet the demand for channels exceeds the supply.

The radio frequency (RF) operating environment for cellular/PCS systems is degraded by interference, including multipath fading caused by interference from reflected versions of the desired signal, co-channel interference caused by multiple users sharing the same frequency within a communication system, and noise from many different sources such as other communication systems, vehicle ignition systems and the like.

All interfering signals are undesirable and their effects can be mitigated by increasing the communication system's carrier-to-interference (C/I) ratio. An increase in a system's C/I ratio allows a reduction in transmitter power, an increase in the number of user channels per geographic area, and/or an increase in the distance between base stations. Typical cellular/PCS systems make no assumptions about the RF operating environment and include single element, switched element, and/or multiple element devices, such as fixed beam formers and simple diversity combiners. These devices allow multi-path and some related C/I enhancements to be made, but do not allow for any dynamic interference reduction. These systems typically assume that the largest signal is the signal of interest and thus do not positively identify the signal of interest.

Constant modulus (CM) techniques may be used in communication systems to separate interference from the desired signal based on an assumption of constant signal envelope. Under this assumption, which is valid for present and planned transmission standards, the desired signals in the received signals are assumed to have constant signal envelopes. However, the constancy of the signal envelope is disrupted by interference so that the received signal has a signal envelope which is not constant, and it is therefor desirable to reduce the effects of interference by signal processing so as to reduce the variance of the signal envelope of the desired signal.

Conventional CM techniques may use algorithms such as least-means-square (LMS) or recursive-least-squares (RLS) to iteratively minimize a cost function based on deviations from the constant envelope property of the desired signal. When a multitude of constant envelope signals are present, each desired signal may be separately extracted by estimating one of the desired signals with a CM beamformer and then removing the estimated desired signal with a signal canceler. These steps may be repeated on the entirety of the multitude of signals until all desired signals are estimated. This method provides certain advantages, such as low computational intensity, reduced need for calibration, no need for signal estimates, and rapid response to environmental changes. However, the speed of convergence is too slow for many applications and improvements are desirable. For further background, CM techniques are discussed in Sublett, Brian J., Gooch, Richard P., and Goldberg, Steven H., *Separation and Bearing Estimation of Cochannel Signals,* Proc. of the 1989 IEEE Military Communications Conference, and LMS and RLS techniques are discussed in Widrow, B., and Stearns, S., *Adaptive Signal Processing,* Prentice-Hall, 1985.

Accordingly, it is an object of the present invention to provide a novel signal processing system and method for adaptive receive beam steering which increases C/I and decreases signal envelope variance and obviates the problems of the prior art.

It is an additional object of the present invention to provide a novel signal processing system and method for increasing C/I and decreasing signal envelope variance of each of plural signals received at an antenna array in a wireless communication system using single or multiple stage subspace projection and a constant modulus beamformer in which each of the stages separate and optimize one of the signals and projects the remaining signals (if present) to the subspace of the next stage.

It is another object of the present invention to provide a novel system incorporating a multi-channel, wideband digital signal processing architecture in which the entire received spectrum of RF signal is coherently block converted with high dynamic range.

It is yet another object of the present invention to provide a novel system and method for reducing interference effects which can be installed in an existing base station and connected to a standard antenna-to-base station transceiver point.

It is still another object of the present invention to provide a novel system and method for processing an N channel communication signal with the ability to fully beam steer independent of air standard, even where the time and direction of arrival of the signal is not known to the base station.

It is a further object of the present invention to provide a novel system and method in which the beam is steered on the correct received signal and not on an interferer by positively identifying the signal.

It is yet a further object of the present invention to provide a novel system and method without need for array calibration or array element symmetry.

It is still a further object of the present invention to provide a novel method and system which has the ability to dynamically track changes in the RF operating environment and optimally maximize C/I, including such environmental changes as introduction of new interferers, delay and angle of arrival spread of multipath, and angle of arrival of the intended signal.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

The present invention improves conventional signal processing tools for enhancing C/I and reducing the signal envelope variance of the desired signals. That is, it reduces destructive multipath, constructively sums multipath, steers aperture to the desired signal, and identifies and nulls interferers. A multistage CM beamformer separates the signals which exhibit a constant signal envelope, and at each stage of the beamformer the processing problem is deflated by projecting the output of the previous stage into the subspace of the remaining signals to thereby (a) increase desired signal power, (b) improve C/I, (c) reduce the dimensionality of the iterative cost minimization, and (d) attempt to orthogonalize the input correlation matrix for resolvable signals.

Figure 1:
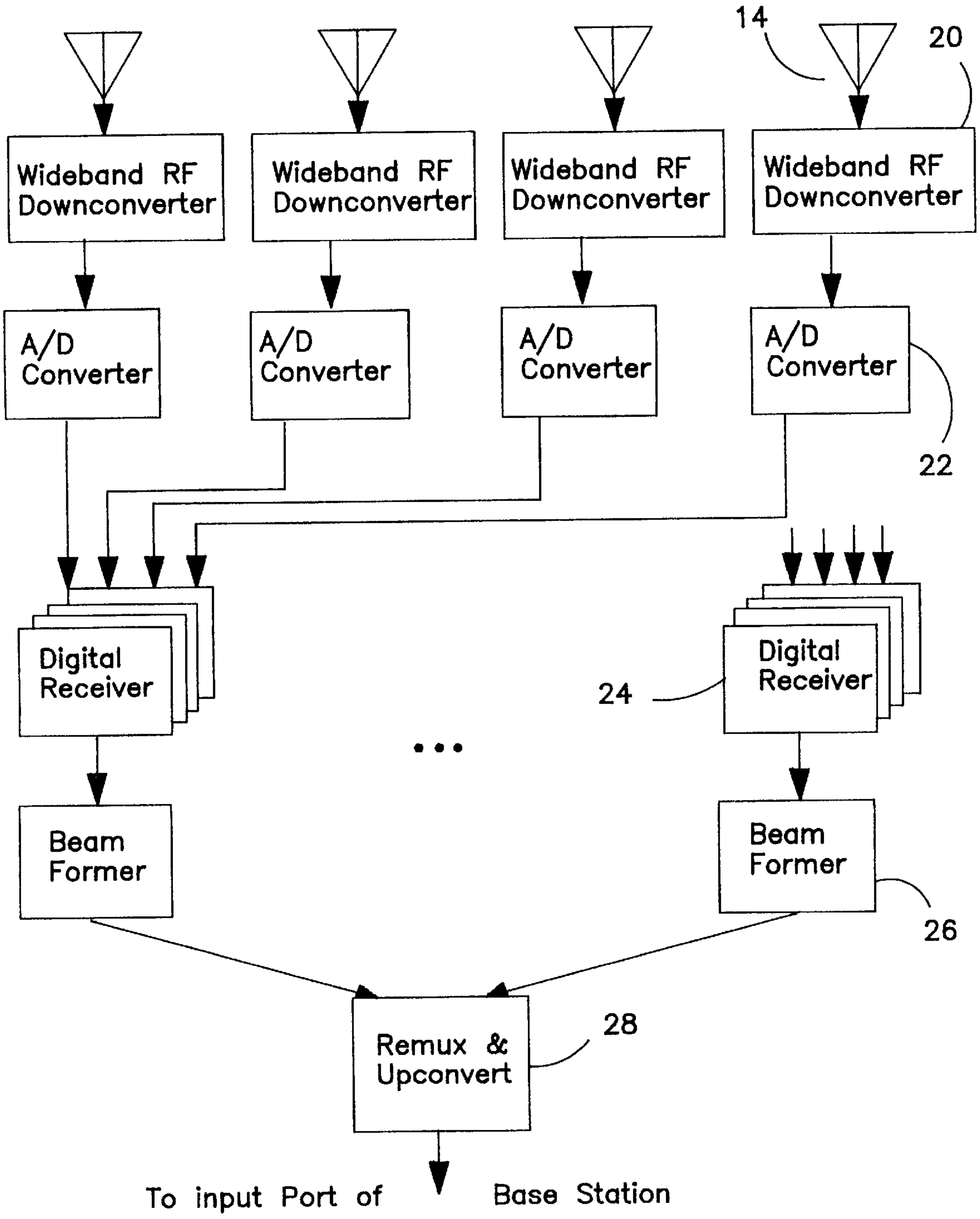
FIG. 1 is a block diagram of an adaptive antenna array system of the present invention.

With reference now to FIG. 1, the present invention may include a cellular or PCS system having an antenna array with a plurality of N antennae 14 for receiving communication signals with multiple channels, where each channel may include a plurality of individual signals. The received signals from each antenna element 14 may be input to a wideband RF downconverter 20 which converts the entire operating RF band to a wideband RF baseband frequency at very high dynamic range. The downconverted wideband RF may be digitized by an analog-to-digital converter 22, and the signals in the digitized downconverted wideband RF may be separated into N channelized and digitized signals by a digital receiver 24 comprising complex mixers and digital FIR filters (not shown). The N outputs of digital receiver 24 may be input to a digital signal processor-based (DSP-based) beamformer 26, and the beamformed output signals from beamformer 26 converted back to their initial RF form by a digital to analog converter (not shown) and then an RF upconverter 28 and input to the input port of a conventional cellular/PCS base station (not shown.) The downconverter 20, A/D converter 22, receiver 24, and upconverter 28 may be conventional.

Figure 2:
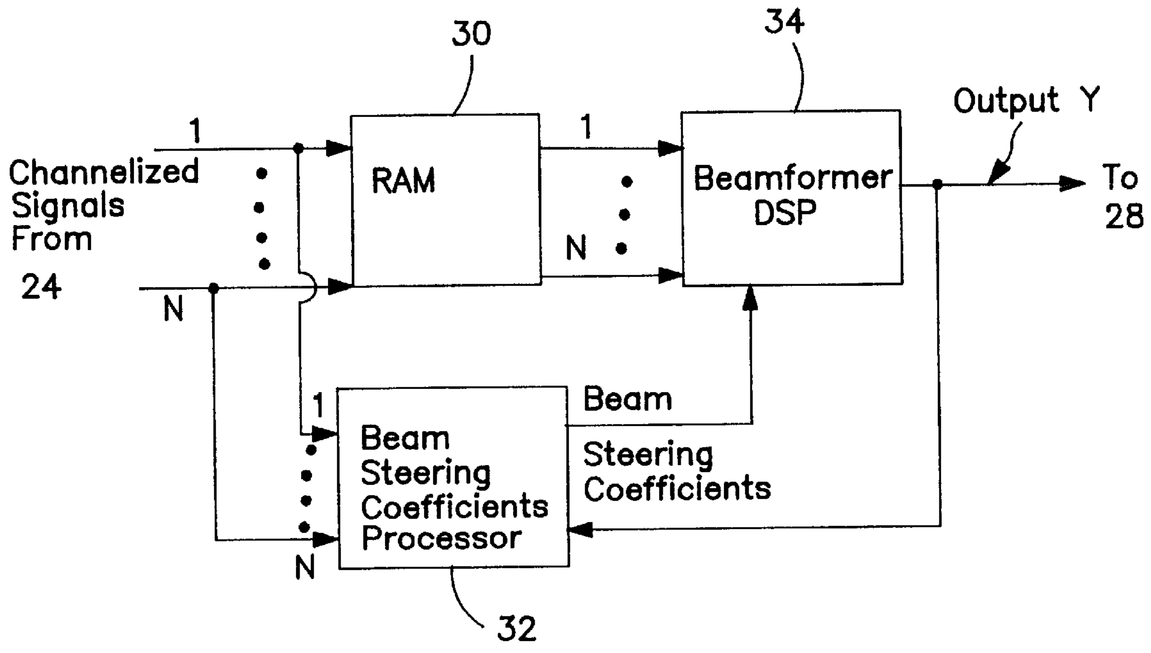
FIG. 2 is a block diagram of an embodiment of the beamformer of FIG. 1.

With reference now to FIG. 2, beamformer 26 may include a random access memory (RAM) 30, a beam steering coefficients processor 32 and a beamformer digital signal processor (DSP) 34. RAM 30 stores the incoming N digitized signals while beam steering coefficients processor 32 calculates the beam steering coefficients. RAM 30 delays the incoming signals until DSP 34 has been initialized with the beam steering coefficients from beam steering coefficients processor 32. The delay allows beam steering for random time and random direction of arrival signals, and may be omitted if the correct signal is always the highest power signal received. The beam steering coefficients may be calculated iteratively as will be discussed further below. After the beam steering coefficients are calculated, the signals stored in RAM 30 are processed through DSP 34 to separate and identify the desired and undesired signals. Each desired signal is then transmitted to upconverter 28 for conversion to its original carrier frequency and for transmission to the base station for further processing.

Figure 3:
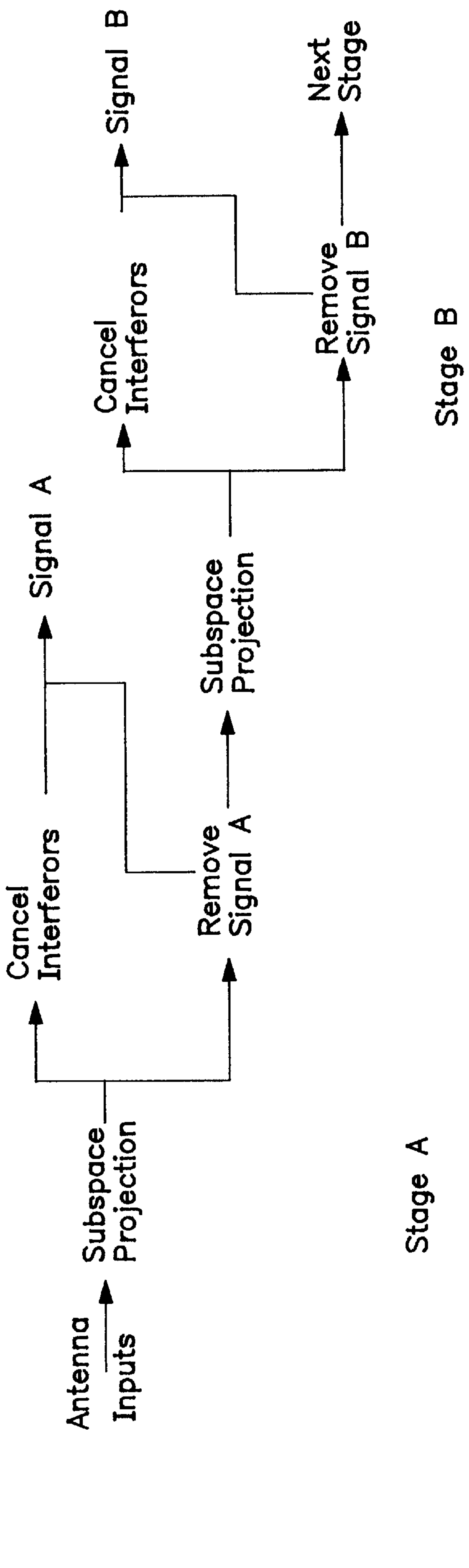
FIG. 3 is a functional diagram illustrating operation of an embodiment of the digital signal processor of FIG. 2.

With reference now to FIG. 3 which is a functional diagram of DSP 34, DSP 34 projects the receiver output vector onto the subspace defined by the signals present. If more than one signal is present, a CM beamformer isolates one of the signals. The isolated signal is removed from the projected receiver output vector and then the resulting vector is projected onto the subspace spanned by the remaining signals. This procedure is repeated until the final projection results in a single signal. The isolated signals produced by each stage are examined for features distinguishing the desired signal (for example, the presence of the correct Supervisory Audio Tone (SAT) frequency for the AMPS standard) and the desired signal is then selected for output to the upconverter.

Figure 4:
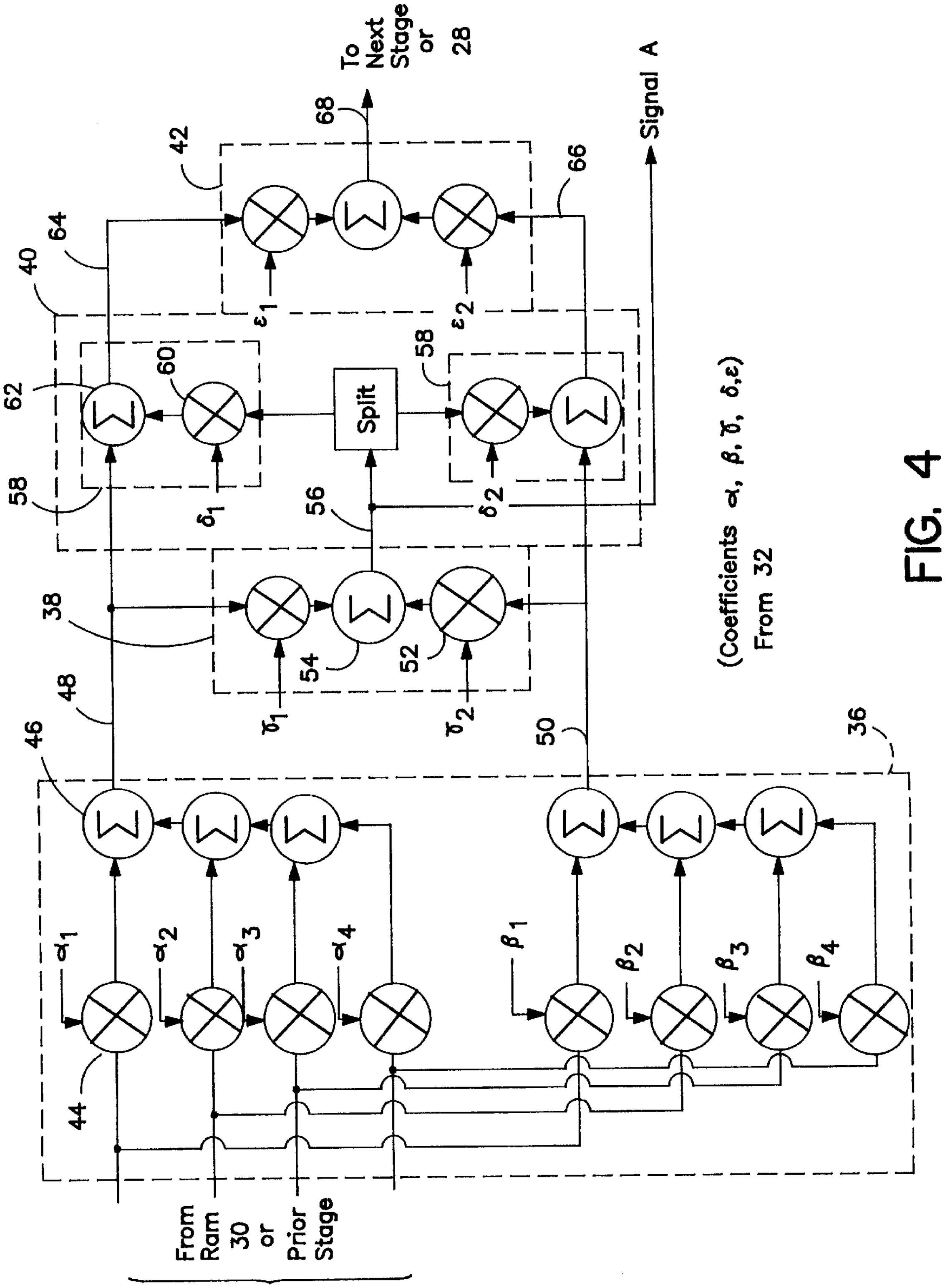
FIG. 4 is circuit diagram of an embodiment of a stage of the digital signal processor of FIG. 2.

FIG. 4 illustrates an example of DSP 34 for a four antennae system where two signals are in the received signal, and which functions in the manner illustrated in FIG. 3. The exemplary embodiment may include a first subspace projector 36, a constant modulus (CM) canceler 38, a least means square (LMS) canceler 40, and a second subspace projector 42.

First subspace projector 36 may include a plurality of multipliers 44, each for receiving an input signal from RAM 30 (or a prior stage in another embodiment) and a coefficient from coefficient processor 32. The input signals are weighted by the appropriate coefficients and combined in summers 46, whereby the four-dimensional input is projected onto the two dimensional signal subspace. The two outputs 48 and 50 from first subspace projector 36 convey the two dimensional signal subspace vector to CM canceler 38 and to LMS canceler 40.

Outputs 48 and 50 are combined in CM canceler 38 using a constant modulus (CM) cancelling technique to estimate desired signal A. CM canceler 38 may include multiplier 52 for receiving one of the outputs 48 or 50 and a coefficient from coefficient processor 32, and a summer 54 for combining the signals from multipliers 52. The output 56 from summer 54 is desired signal A which is provided as an output from DSP 34 and as an input to LMS canceler 40.

Output 56 is provided to each of two correlation cancelers 58 in LMS canceler 40 and which are iteratively updated to perform the LMS cancelling. Each correlation canceler 58 includes a multiplier 60 for receiving output 56 and a further iteratively updated coefficient from coefficient processor 32, and a summer 62. Correlation cancelers 58 remove desired signal A from the output 48 and 50. Outputs 64 and 66 from LMS canceler 40 are provided to second subspace projector 42 where the two signals are combined to project their two dimensional space onto a one dimensional space for the remaining signal (recall that there were but two signals in this example.) Output 68 from projector 42 is examined along with output 56 to determine which signal is from the desired user, and the selected signal may then be provided to upconverter 28.

The example of FIG. 4 may be expanded and repeated in serially aligned stages as needed, depending on the number of antennae and the number of signals.

The calculation of the beam steering coefficients is of obvious importance. In the optimum diversity combining used herein the coefficients depend on angle of incidence, array geometry, multipath, and the phase shifts and losses associated with connecting cables and other components. In conventional direction finding applications, each of these factors must be estimated, with attendant array calibrations. In contrast, the system herein does not require separate estimates as all of the factors may be considered together.

By way of further explanation, and considering the operation of the invention conceptually as a diversity combiner, an input from each antenna is weighted with a coefficient and combined to provide a beamformer output. The coefficients are selected to align the signal phases and to weight each antenna input in proportion to the C/I ratio. Two of the benefits of diversity combining are the mitigation of multipath fading and decreased probability of deep fades. Since the signals received at antennae spaced sufficiently apart fade independently, it is unlikely that each antenna will experience a deep fade at the same time. Accordingly, the combiner output exhibits greater stability than a single antenna.

In an embodiment of the present invention the coefficients are iteratively updated by coefficient processor 32 and provided to DSP 34 for weighting the various signals to thereby account for all the factors above. For a one signal case, beam steering coefficient processor 32 may calculate $y=u^H x$, where u is the unit length beamforming vector which maximizes the mean-square value of the beamformer output y (and superscript H specifies the conjugate transpose of the vector), and x is the complex vector with components equal to the narrowband outputs derived from each of the antenna inputs for a single narrowband frequency channel. The mean-square value of the beamformer output may be expressed in terms of the correlation matrix of array outputs $R=E\{xx^H\}$, as $$E\{yy^*\}=E\{(u^H x)(u^H x)^H\}=E\{u^H xx^H u\}=u^H E\{xx^H\}u=u^H Ru$$

The desired beamformer vector u is thus a solution to the constrained optimization problem of maximizing $u^H Ru$ subject to $u^H u=1$.

The unit length eigenvector associated with the largest eigenvalue of R is the solution to the optimization problem (see, G. W. Stewart, *Introduction to Matrix Computations,* p. 314.)

With further reference to the one signal case, one approach to optimum beamforming is to estimate the correlation matrix from N samples of x using, $$\hat{R}=\sum_{i=0}^{N-1} x_i x_i^H$$

and then estimating the principal eigenvector of $\hat{R}$ using a conventional numerical method. Increasing the number of samples of x will reduce the error in estimating R, but too many samples will degrade the tracking performance of the beamformer.

Another approach is to use iterative methods to find the subspace basis given by the set of eigenvectors associated with the N largest eigenvalues of the spatial covariance matrix R, where N is the number of signals present. One iterative method, the linearized stochastic gradient ascent (SGA) algorithm (see, E. Oja, *Subspace Methods of Pattern Recognition,* p. 62, Research Studies Press, 1983), is preferred. For the case of a single signal, the iteration for computing an updated eigenvector $u_{i+1}$ from the previous estimate of $u_i$ and a new sample $x_i$ is $$u_{i+1}=u_i+\mu[x_i x_i^H u_i-(u_i^H x_i x_i^H u_i)u_i]$$

and $\mu$ is a small positive constant which determines the tradeoff between convergence rate and steady-state error variance. The update iteration may be expressed in terms of the beamformer output $y_i=u_i^H x_i$ as $$u_{i+1}=u_i+\mu[x_i y_i^*-(y_i y_i^*)u_i]=(1-\mu|y_i|^2)u_i+\mu y_i^* x_i$$

When more than one signal is present, a multidimensional version may be used to estimate the other signal eigenvectors. These eigenvectors may then be used to perform subspace projection prior to the CM beamformer.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of increasing the carrier-to-interference ratio (C/I) and decreasing signal envelope variance of each of plural signals received at an antenna array in a wireless communication system, the method comprising the steps of:

(a) providing the received plural signals in digital form to a multistage, constant modulus beamformer; and (b) at each of plural stages of the beamformer, (i) separating one of the plural signals from a stage input so that a stage output is the remaining ones of the plural signals, and (ii) projecting the stage output onto a subspace of the remaining signals in the next stage, whereby variability of the signal envelope of the separated signals is reduced.

2. The method of claim 1 wherein the step of separating one of the signals in a stage comprises the steps of:

using a constant modulus algorithm to generate the separated signal from the stage input; and removing the separated signal from the stage input so as to provide the remaining signals as the stage output.

3. The method of claim 1 wherein the step of providing the received plural signals in digital form to the beamformer comprises the steps of:

for each antenna in the antenna array, converting the received RF band to baseband in a wideband RF downconverter;

digitizing the downconverted signals;

separating the downconverted signals into channels; and providing the channelized signals to the beamformer.

4. The method of claim 1 wherein there are n of the plural signals, and further comprising the step, before the first stage of the beamformer, of combining the received plural signals in a subspace projector to provide n weighted inputs to the first stage.

5. The method of claim 4 wherein the step of combining the plural signals comprises the steps of:

multiplying the signal received on plural ones of the antenna by a weight factor; and sequentially summing the weighted signal from the plural antenna to provide the n weighted inputs to the first stage.

6. The method of claim 4 wherein the stage input for each stage after the first stage comprises the n weighted inputs which have had the separated signals from prior stages removed therefrom.

7. The method of claim 4 where n=1 and further comprising the step of solving $$y=u^H x$$

where u is the unit length beamforming vector which maximizes the mean-square value of the beamformer output y, and x is the complex vector with components equal to the received plural signals.

8. The method of claim 7 further comprising the step of maximizing $u^H Ru$, where $u^H u=1$ and $R=E\{xx^H\}$, wherein the maximum is found with the largest eigenvalue of R.

9. The method of claim 8 further comprising the steps of finding the largest eigenvalue of R by estimating a correlation matrix from N samples of x using, $$\hat{R} = \sum_{i=0}^{N-1} x_i x_i^H$$

and estimating the principal eigenvector of $\hat{R}$ using a numerical method.

10. The method of claim 1 further comprising the step of finding a basis of the subspace by iteratively using a linearized stochastic gradient ascent (SGA) algorithm to find a set of eigenvectors associated with the N largest eigenvalues of a spatial covariance matrix R.

11. A method of decreasing signal envelope variance of each of plural signals received at an antenna array in a wireless communication system, the method comprising the steps of:

(a) providing the received plural signals in digital form to a constant modulus beamformer having plural stages; and (b) projecting an output from each of the plural stages onto a subspace of remaining signals, wherein a basis of the subspace is given by a set of eigenvectors associated with the N largest eigenvalues of a spatial covariance matrix R.

12. The method of claim 11 further comprising the steps of finding the basis of the subspace iteratively using a linearized stochastic gradient ascent (SGA) algorithm.

13. The method of claim 11 further comprising the step of separating one of the signals in a stage by, using a constant modulus algorithm to generate the separated signal from the stage input; and removing the separated signal from the stage input so as to provide the remaining signals as the stage output.

14. A signal processing system for reducing multipath and interference in communication signals received on an array of N antennae, the signal processing system comprising plural stages which each comprise:

first subspace projecting means coupled to the received signals for projecting N signals onto an N/2-dimensional subspace comprising, (i) first weighting means for selectively weighting each of the signals from one of the N antennae by separate weight factors, and (ii) first summing means for combining the signals from said first weighting means to generate first and second array signals;

constant modulus cancelling means coupled to the first and second array signals for generating a separated output signal; and least-means-square cancelling means coupled to the first and second array signals and to the separated output signal for removing the separated output signal from the first and second array signals.

15. The system of claim 14 wherein said constant modulus cancelling means comprises second weighting means coupled to the first and second array signals for selectively weighting the first and second array signals by separate weight factors, and second summing means for combining the signals from the second weighting means to generate the separated output signal.

16. The system of claim 14 wherein said least-means-square cancelling means comprises third weighting means coupled to the separated output signal for selectively weighting plural copies of the separated output signal by separate weight factors, and third summing means for combining the first array signal and one of the weighted separated output signals to generate a revised first array signal and for combining the second array signal and one of the weighted separated array output signals to generate a second array output signal.

17. A method of separating plural signals received at an antenna array in a wireless communication system so that each signal is enhanced with respect to interference, noise, and multipath fading, then determining which of these signals is the desired signal, and finally selecting this signal and converting it back to an RF form that may be input to a conventional single-input receiver, the method comprising the steps of:

(a) providing the received plural signal vector in digital form to a multistage constant modulus beamformer;

(b) at each of the plural stages of the beamformer, (i) estimating the signal subspace spanned by the received plural signal vector in the absence of noise, (ii) projecting the received plural signal vector onto this subspace, thereby reducing the dimension of the vector, (iii) if the resulting vector is one dimensional, then the single component is the final output signal, otherwise, (iv) isolating one of the plural signals from the projected vector of this stage, (v) removing this signal from all components of the projected vector of this stage, and (vi) passing the resulting vector to the next stage of the process by repeating steps (i) through (vi) until a single signal remains at step (iii); and (c) examining features of each isolated signal that identify the desired signal; and (d) providing the desired isolated signal in analog RF from to a conventional single-input receiver.

18. The method of claim 17 wherein the step of estimating the signal subspace spanned by the received plural signal vector comprises the step of using linearized stochastic gradient ascent algorithm to iteratively estimate the one or more signal eigenvectors of the spatial covariance matrix R.

19. The method of claim 17 wherein the step of projecting the received plural signal vector comprises the step of computing dot products of the received plural signal vector with the estimated signal eigenvectors, these dot products defining the elements of the projected vector for this stage.

20. The method of claim 17 wherein the step in which one of the plural signals contained in the projected vector is isolated comprises the step of combining the components of the projected vector with a constant modulus beamformer.

21. The method of claim 17 wherein the isolated signal is removed from the projected vector comprises the step of determining a set of weights such that the isolated signal, when multiplied by the set of weights and subtracted from the components of the projected vector, removes the isolated signal from the components of the projected vector, the weights being iteratively estimated using a least mean square or stochastic gradient descent algorithm.

22. The method of claim 17 wherein the step of providing the received plural signals in digital form to the beamformer comprises the steps of, for each antenna in the antenna array, converting the received RF band to baseband in a wideband RF downconverter, digitizing the downconverted signals, separating the wideband downconverted signals into narrowband frequency channels, and providing the narrowband channelized signal to the beamformer.

23. The method of claim 17 wherein the step of examining features of each isolated signal that identify the desired signal comprises the step of demodulating each of the isolated signals and then extracting the identifying features, such as the supervisory audio tone frequency or digital color codes.

24. The method of claim 17 wherein the step of providing the desired isolated signal in analog RF from to a conventional single-input receiver comprises the steps of, converting the selected narrowband signal back into wideband baseband signal in the original frequency channel, summing this wideband signal with wideband signals produced by beamformers operating on different frequency channels, converting the resulting composite wideband signal to an analog format using a digital-to-analog converter, upconverting the resulting analog baseband signal back to the original RF band, and providing the resulting wideband RF signal to the input to a conventional single-input receiver.

* * * * *